United States Patent
D'Angelo et al.

(10) Patent No.: US 7,921,320 B2
(45) Date of Patent: Apr. 5, 2011

(54) SINGLE WIRE SERIAL INTERFACE

(75) Inventors: Kevin P. D'Angelo, Santa Clara, CA (US); David Alan Brown, Los Gatos, CA (US); John Sung K. So, Freemont, CA (US); Jan Nilsson, Sunnyvale, CA (US); Richard K Williams, Cupertino, CA (US)

(73) Assignee: Advanced Analogic Technologies, Inc., Sunnyvale, CA (US)

( * ) Notice: Subject to any disclaimer, the term of this patent is extended or adjusted under 35 U.S.C. 154(b) by 31 days.

(21) Appl. No.: 11/582,927

(22) Filed: Oct. 17, 2006

(65) Prior Publication Data

US 2007/0038879 A1  Feb. 15, 2007

Related U.S. Application Data

(63) Continuation of application No. 10/144,333, filed on May 13, 2002, now Pat. No. 7,127,631.

(60) Provisional application No. 60/368,474, filed on Mar. 28, 2002.

(51) Int. Cl.
  *G06F 1/04* (2006.01)
  *G06F 1/00* (2006.01)
  *G06M 3/00* (2006.01)
  *H03K 21/00* (2006.01)

(52) U.S. Cl. ............ 713/502; 713/500; 713/600; 377/1; 377/27

(58) Field of Classification Search .................. 713/500, 713/502, 600
  See application file for complete search history.

(56) References Cited

U.S. PATENT DOCUMENTS

| 231,087 | A | 8/1880 | Powers |
| 447,918 | A | 3/1891 | Strowger |
| 540,168 | A | 5/1895 | Keith |
| 597,062 | A | 1/1898 | Keith et al. |
| 1,231,013 | A | 6/1917 | Goodrum |
| 2,136,630 | A | 11/1938 | Massonneau |
| 2,149,343 | A | 3/1939 | Hubbard |
| 2,724,020 | A | 11/1955 | Judy |
| 3,387,270 | A | 6/1968 | Adlhoch et al. |

(Continued)

FOREIGN PATENT DOCUMENTS

CN  1639672 A  7/2005

(Continued)

OTHER PUBLICATIONS

Ullah, Zafar, "SX Reset Considerations", UBICOM, Nov. 2000.*

(Continued)

*Primary Examiner* — Ji H Bae
(74) *Attorney, Agent, or Firm* — DLA Piper LLP (US)

(57) ABSTRACT

A single wire serial interface for power ICs and other devices is provided. To use the interface, a device is configured to include an EN/SET input pin. A counter within the device counts clock pulses sent to the EN/SET input pin. The output of the counter is passed to a ROM or other decoder circuit. The ROM selects an operational state for the device that corresponds to the value of the counter. In this way, control states may be selected for the device by sending corresponding clock pulses to the EN/SET pin. Holding the EN/SET pin high causes the device to maintain its operational state. Holding the EN/SET pin low for a predetermined timeout period resets the counter and causes the device to adopt a predetermined configuration (such as off) until new clock pulses are received at the EN/SET pin.

47 Claims, 4 Drawing Sheets

U.S. PATENT DOCUMENTS

| | | | |
|---|---|---|---|
| 3,492,434 A | | 1/1970 | Michel |
| 3,544,803 A | | 12/1970 | Taylor |
| 3,698,631 A | * | 10/1972 | Drechsler ............... 708/277 |
| 3,814,861 A | | 6/1974 | Robbins |
| 3,845,473 A | | 10/1974 | Kawashima |
| 3,889,236 A | | 6/1975 | Herger et al. |
| 3,940,567 A | | 2/1976 | Iki et al. |
| 3,993,877 A | | 11/1976 | Sendyk et al. |
| 4,036,762 A | | 7/1977 | Troetscher et al. |
| 4,060,735 A | | 11/1977 | Pascucci et al. |
| 4,085,403 A | | 4/1978 | Meier et al. |
| 4,155,084 A | * | 5/1979 | Klees ..................... 345/39 |
| 4,215,246 A | | 7/1980 | Sawyer |
| 4,254,304 A | | 3/1981 | Fulghum |
| 4,303,915 A | | 12/1981 | D'Angelo et al. |
| 4,304,989 A | | 12/1981 | Vos et al. |
| 4,310,828 A | * | 1/1982 | Baker ................. 340/825.22 |
| 4,314,828 A | | 2/1982 | Saito et al. |
| 4,328,482 A | | 5/1982 | Belcher et al. |
| 4,465,956 A | | 8/1984 | Fowler |
| 4,559,536 A | * | 12/1985 | Olesen et al. ............. 340/3.55 |
| 4,625,205 A | | 11/1986 | Relis |
| 4,656,620 A | | 4/1987 | Cox |
| 4,675,864 A | | 6/1987 | Bliek et al. |
| 4,788,527 A | | 11/1988 | Johansson |
| 4,847,648 A | * | 7/1989 | Yamaguchi et al. ........... 396/84 |
| 4,914,680 A | * | 4/1990 | Tanno et al. ................. 377/49 |
| 5,210,846 A | | 5/1993 | Lee |
| 5,248,919 A | | 9/1993 | Hanna et al. |
| 5,319,601 A | | 6/1994 | Kawata et al. |
| 5,412,644 A | | 5/1995 | Herberle |
| 5,508,650 A | | 4/1996 | Grimm et al. |
| 5,593,430 A | | 1/1997 | Renger |
| 5,807,283 A | * | 9/1998 | Ng ..................... 600/595 |
| 5,822,369 A | | 10/1998 | Araki |
| 5,826,068 A | | 10/1998 | Gates |
| 6,034,955 A | | 3/2000 | Cho |
| 6,049,358 A | * | 4/2000 | Jun .................... 348/546 |
| 6,054,782 A | | 4/2000 | Girard et al. |
| 6,141,764 A | | 10/2000 | Ezell |
| 6,205,182 B1 | | 3/2001 | Pardini et al. |
| 6,215,817 B1 | | 4/2001 | Kimura |
| 6,249,480 B1 | | 6/2001 | Mick |
| 6,298,066 B1 | | 10/2001 | Wettroth et al. |
| 6,397,077 B1 | * | 5/2002 | Jensen ................. 455/553.1 |
| 6,487,674 B1 | | 11/2002 | White et al. |
| 6,614,862 B1 | * | 9/2003 | Doblar ................... 375/354 |
| 6,651,129 B1 | | 11/2003 | Smith et al. |
| 6,674,846 B1 | | 1/2004 | Stevens |
| 6,950,440 B1 | | 9/2005 | Conway |
| 7,000,140 B2 | | 2/2006 | Okubo et al. |
| 7,039,150 B1 | | 5/2006 | Drori |
| 7,080,266 B2 | | 7/2006 | D'Angelo et al. |
| 7,127,631 B2 | * | 10/2006 | D'Angelo et al. ........... 713/502 |
| 2002/0039891 A1 | * | 4/2002 | Loke et al. ................ 455/127 |
| 2002/0047642 A1 | * | 4/2002 | Miyagawa ............... 315/307 |
| 2002/0051508 A1 | * | 5/2002 | Tachimori ................ 375/376 |
| 2002/0107654 A1 | * | 8/2002 | Mori et al. ............... 702/120 |
| 2002/0123255 A1 | * | 9/2002 | Kertesz ................. 439/135 |
| 2002/0149320 A1 | * | 10/2002 | Maruyama et al. ........ 315/169.3 |
| 2003/0102819 A1 | * | 6/2003 | Min et al. ............... 315/291 |
| 2003/0188202 A1 | | 10/2003 | D'Angelo et al. |
| 2003/0212918 A1 | | 11/2003 | D'Angelo et al. |
| 2005/0169345 A1 | | 8/2005 | Urbas et al. |

FOREIGN PATENT DOCUMENTS

| | | |
|---|---|---|
| CN | 1311318 C | 4/2007 |
| EP | 0 545 828 A | 6/1993 |
| EP | 1488307 A1 | 12/2004 |
| JP | 58-056504 | 4/1983 |
| JP | 2-119019 | 5/1990 |
| JP | 1995-107021 | 4/1995 |
| JP | 63-196103 | 8/1998 |
| JP | 2005521944 | 7/2005 |
| KR | 2001-0064409 | 7/2001 |
| KR | 10-2004-0096627 | 11/2004 |
| WO | WO 03/083677 | 10/2003 |

OTHER PUBLICATIONS

Office Action in Inter Partes Reexamination U.S. Appl. No. 95/000,501, to USP 7,127,631, parent of current application.

"SX Reset Considerations," *Application Note 18*, Zafar Ullah, Ubicom, Inc., Mountain View, CA, marked Nov. 2000.

Bates, Regis et al., *Voice and Data Communications Handbook*, McGraw Hill, New York, 1997, pp. 7-12.

Dwyer, David, *Understanding Data Communications, Sixth Edition*, New Riders Publishing, Indianapolis, IN, 1999, pp. 83-85.

Bates, Regis et al., *Voice and Data Communications Handbook*, McGraw Hill, New York, 1997, pp. 50-69.

"Decade Counter With 10 Decoded Outputs," *HCF4017B*, STMicroelectronics, Italy, marked Sep. 2001, pp. 1-11.

"16 and 20 Bit, 8-Pin ΔΣADC," *Crystal CS5510/11/12/13*, Cirrus Logic, Inc., Austin, Texas, marked 2000, pp. 1-25.

*The Encyclopedia Britannica, A Dictionary of Arts, Sciences, Literature and General Information, Eleventh Edition*, vol. XXVI, Encyclopedia Britannica, Inc., New York, pp. 547-557. Eleventh edition (published 1911).

"S3CA400A01 Microprocessor Compainion Chip, 1-Wire Bus Master (Preliminary)," Samsung Electronics, Korea, marked Dec. 7, 2001, pp. 10-1 through 10-10.

"Using a UART to Implement a 1-Wire Bus Master," *Application Note 214*, Maxim Integrated Products, Sunnyvale, CA, marked Sep. 10, 2002, pp. 1-10.

"Using an API to Control the DS1WM 1-Wire® Bus Master," *Application Note 120*, Maxim Integrated Products, Sunnyvale, CA, marked Mar. 8, 2002, pp. 1-8.

"Interfacing the Maxim 1-Wire Master (DS1WM) to an ARM7 Processor," *Application Note 145*, Maxim Integrated Products, Sunnyvale, CA, marked Jul. 5, 2001, pp. 1-3.

Web page relating to "Book of iButton® Standards," *Application Note 937*, Maxim Integrated Products, Sunnyvale, CA, marked Jan. 16, 2002, pp. 1-2.

Non-Final Office Action dated Nov. 16, 2005 for U.S. Appl. No. 10/447,764.

Response and Amendment dated Feb. 2, 2006 for U.S. Appl. No. 10/447,764.

Examiner-Initiated Interview Summary Record dated Feb. 1, 2006 for U.S. Appl. No. 10/447,764.

Notice of Allowance and Notice of Allowability dated Mar. 9, 2006 for U.S. Appl. No. 10/447,764.

Non-final Office Action mailed Jan. 10, 2005.

Response to Non-final Office Action mailed Jan. 10, 2005.

Final Office Action mailed May 26, 2005.

Response to Final Office Action mailed May 26, 2005.

Advisory Action mailed Aug. 26, 2005.

Amendment and Response filed Oct. 25, 2005.

Non-final Office Action mailed Dec. 27, 2005.

Response to Non-final Office Action mailed Dec. 27, 2005.

Notice of Allowance mailed Jun. 9, 2006.

Request for Inter Partes Reexamination, filed Oct. 3, 2009.

Order Granting Request for Inter Partes Reexamination, mailed Dec. 29, 2009.

Notice of Prior or Concurrent Proceedings, filed Mar. 9, 2010.

PCT/US2003/009636, International Search Report, mailed Sep. 30, 2003.

Korean Patent Application No. 10-2004-7013451, Korean Intellectual Property Office Notice of Preliminary Rejection, mailed Oct. 30, 2009 (Korean Language).

Korean Patent Application No. 10-2004-7013451, Korean Intellectual Property Office Notice of Preliminary Rejection, mailed Oct. 30, 2009 (English Language Translation).

Korean Patent Application No. 10-2004-7013451, English Translation of Claims Pending, dated Dec. 4, 2009.

Complaint for Patent Infringement, filed by Advanced Analogic Technologies, Inc. on Mar. 27, 2009, *without* exhibits.

First Amended Complaint for Patent Infringement, filed by Advanced Analogic Technologies, Inc. on Jul. 24, 2009, *without* exhibits.

Answer and Counterclaims to First Amended Complaint, filed by Kinetic Technologies, Inc. on Aug. 7, 2009.

AATI's Response to Kinetic Technologies, Inc.'s Answer and Counterclaims to First Amended Complaint, filed by Advanced Analogic Technologies, Inc. on Aug. 26, 2009.

Advanced Analogic Technologies, Inc.'s Notice of Initial Disclosure Pursuant To Fed.R.Civ.P. 26(a)(1), served Jun. 5, 2009.

Defendant Kinetic Technologies, Inc.'s Rule 26(A) Initial Disclosures, served Jul. 21, 2009.

AATI's Disclosure Of Asserted Claims And Preliminary Infringement Contentions (Patent L.R. 3-1) And Accompanying Document Production (L.R. 3-2) (including infringement contention charts attached as Exhibits 1-10), served Aug. 18, 2009. Certain portions of this document were designated confidential pursuant to protective order.

Defendant Kinetic Technologies, Inc.'s Invalidity Contentions Pursuant To Patent L.R. 3-3, served Oct. 5, 2009.

Advanced Analogic Technologies, Inc.'s Preliminary Claim Constructions and Extrinsic Evidence Pursuant to L.R. 4-2, served Nov. 2, 2009.

Defendant Kinetic Technologies, Inc.'s Exchange of Preliminary Claim Construction Pursuant to Patent L.R. 4-2, served Nov. 2, 2009.

Joint Claim Construction and Prehearing Statement Pursuant to Patent L.R. 4-3 (including attached Exhibits A-C), filed Nov. 30, 2009.

Complaint for Misappropriation of Trade Secrets, filed Sep. 5, 2008.

Advanced Analogic Technologies, Inc.'s Statement of Claims, dated Feb. 20, 2009.

Claim of Kin Shum and Kinetic Technologies, Inc., dated Feb. 20, 2009.

Order Granting Petition to Compel Arbitration, dated Feb. 10, 2009.

Arbitrator's Order on Disputed Discovery Issues, dated Mar. 25, 2009.

Notice of Entry of Order and Judgment, dated Feb. 2, 2010.

* cited by examiner

SINGLE WIRE SERIAL INTERFACE

RELATED APPLICATIONS

This application is a continuation of Application Ser. No. 10/144,333 filed May 13, 2002, now U.S. Pat. No. 7,127,631, which claims the benefit of a U.S. Provisional Patent Application Ser. No. 60/368,474 entitled "Single Wire Serial Interface: filed Mar. 28, 2002, which are incorporated in this document by reference.

TECHNICAL FIELD OF THE INVENTION

The present invention relates generally to control interfaces for integrated circuits and other devices. More particularly, the present invention includes a single wire serial interface that may be used to control power ICs and other devices.

BACKGROUND OF THE INVENTION

In power IC applications, an interface generally serves to manage functions such as power level, or on and off switching. In the load switch power IC case, the IC either delivers power to a subsystem or not depending on the state of the on/off pin. In a more complex power supply controller, the regulated output voltage is set by a more complex interface such as an integrated 5-pin digital to analog interface. When many subsystems exist within the same system, an even more complex interface, such as the SMBUS interface may be implemented.

The complex power IC can easily afford a multi-pin control interface, since it is already in a large package, and has sufficient functional density. The stand-alone power management function cannot normally offer a complex control interface due to die size or package size constraints. Still there are cases where this type of control is desirable. For instance, it may be desirable to vary a current limit over different load scenarios. However, few pins are available for control of the simple load switch because most of the pins are used by the power function, and there is no board space or budget for a larger package. Some functionality can be added by means of an analog interface, but since most applications are controlled by a microprocessor, a digital interface is easiest to implement and most cost effective. A serial interface is efficient, but common simple serial interfaces such as 3-wire or 2-wire require too many pins. Complex serial interfaces such as SMBUS are generally too complex and expensive to merit implementation for the stand-alone power management function.

For these reasons and others, there is a need for an interface that may be used to control stand-alone power and other IC types. Ideally, this interface would be able to accommodate a wide variety of control needs and be scaleable to many levels of complexity. Minimal pin use is also desirable, with the ideal being use of a single pin that may optionally be shared with another function.

SUMMARY OF THE INVENTION

An aspect of the present invention provides a single wire serial interface that may be used to control stand-alone power ICs and other devices. For this aspect, an IC is configured to include a sensing circuit, a counter, and a ROM or similar decoder. The sensing circuit monitors the voltage present at one of the IC pins. Typically, this will be the on/off pin and is referred to as the EN/SET pin. The sensing circuit determines whether or not the voltage at the EN/SET pin is high, low, or toggling.

When the voltage at the EN/SET pin is toggling the counter is enabled. This causes the counter to count the rising edge of each clock pulse sent to the EN/SET pin. Holding the voltage at the EN/SET pin high causes the counter to stop counting and maintain its value. Holding the voltage at the EN/SET pin low for more than a preset timeout period causes the counter to reset to zero.

The ROM contains a total of $2^n$ words of m bits. Each m-bit word corresponds to one control state for the IC. The output of the counter is an address within the ROM selecting a particular m-bit word and control state. For simple functions, the counter can be only a few bits, in which case the counter outputs can be directly decoded in logic without the complexity of a ROM.

Another aspect of the present invention is an LED current source IC incorporating the single wire serial interface. The LED current source includes at least one current output and one EN/SET input. For a representative implementation, the ROM includes a total of thirty-two (32) words. Each word corresponds to an output level for the one or more current outputs. The output levels -a-re preferably configured as a logarithmic scale, yielding two decades of output levels and LED luminosity.

Another aspect of the present invention is a load switch IC incorporating the single wire serial interface. The load switch includes one EN/SET input and n outputs where n is greater than one. For the case of the load switch, the bits in the counter may be used to directly control the state of the individual outputs (i.e., each bit determines the state of a corresponding output). This allows the ROM to be omitted from the load switch IC, simplifying its design. The bits in the counter yield a total of $2^n$ different output configurations (i.e., all possible configurations).

Another aspect of the present invention is a current limited load switch IC incorporating the single wire serial interface. The current limited load switch includes one or more outputs and one EN/SET input. Each word in the ROM corresponds to a different current limit for the outputs.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

The preferred embodiments of the present invention and their advantages are best understood by referring to FIGS. 1 through 7 of the drawings. Like numerals are used for like and corresponding parts of the various drawings.

Single Wire Serial Protocol

An aspect of the present invention provides a single wire serial protocol that may be used to control ICs and other compatible devices. To use the single wire serial protocol, a device must support a series of different operational states or modes. For one example, a stand-alone power IC might be configured to support a range of different output levels. Typically, these output levels would progress in even increments from a no-power or off condition to a full power condition. Each different output level would define a particular operational state. The single wire serial protocol allows the operational states of compatible devices to be dynamically controlled. Thus, for the stand-alone power IC example, the single wire serial protocol would be used to select different operational states and associated output power levels.

Devices that support the single wire serial protocol are configured to receive an EN/SET signal. As shown by the timing diagram of FIG. 1, the EN/SET signal may be characterized as having three different waveforms. The first of these is a toggling waveform where the EN/SET signal is composed of a series of clock pulses. The second waveform is where the EN/SET signal is asserted to have a constant high value. The third waveform is where the EN/SET signal is asserted to have a constant low value.

The toggling waveform causes compatible devices to select particular operational states. The total number of clock pulses (or rising edges) determines the particular operational state that will be selected (i.e., four clock pulses selects the fourth operational state and so on. Additional clock pulses that exceed the number of operational states supported by a compatible device will generally cause the count to rollover and start again with the first operational state.

Figure 1:
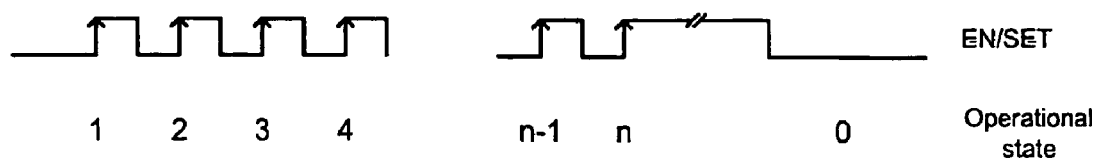
FIG. 1 is a timing diagram illustrating the use of the single wire protocol according to one aspect of the present invention.

The constant high waveform causes compatible devices to maintain their previously selected operational states. As shown in FIG. 1, the current operational state may be continued for an arbitrary duration in this way.

The constant low waveform causes compatible devices to power off (or otherwise adopt a predefined configuration) after a pre-defined timeout period has elapsed. The timeout period allows compatible devices to distinguish between the constant low waveform and the shorter low portions of the toggling waveform. For a typical implementation, the timeout value is 400 µs with the EN/SET signal having a frequency in the range of 1 Mhz to 10 kHz. Higher and lower frequencies are also possible.

Single Wire Serial Interface

Figure 2:
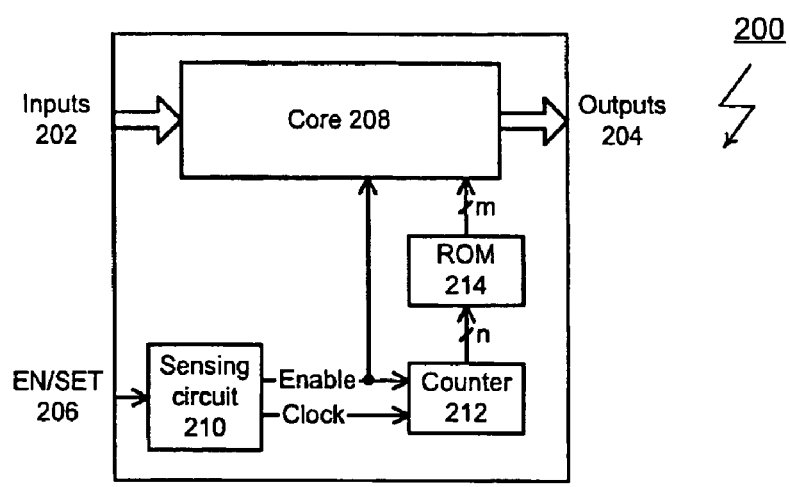
FIG. 2 is a block diagram showing an IC using a single wire serial interface according to one aspect of the present invention.

To use the single wire serial protocol, compatible devices must provide a single wire serial interface. For the purposes of illustration, FIG. 2 shows a block diagram of an IC (generally designated 200) configured to provide this interface. IC 200 includes one or more inputs 202 and one or more outputs 204. IC 200 also includes an EN/SET input 206 and a core portion 208. Core portion 208 is intended to be generally representative of the circuits that function to create outputs 204 using inputs 202 EN/SET input 206 is connected to a sensing circuit 210. Sensing circuit 210 monitors the EN/SET signal at EN/SET input 206 and determines if that voltage is constantly high, constantly low, or toggling. Based on this determination, sensing circuit 210 produces two signals: a Clock signal and an Enable signal. The Clock and Enable signals control the operation of a counter 212 having n bits. Counter 212 counts the rising transitions of the Clock signal whenever sensing circuit 210 asserts the Enable signal. Counter 212 resets whenever the Enable signal is not asserted.

Figure 3:
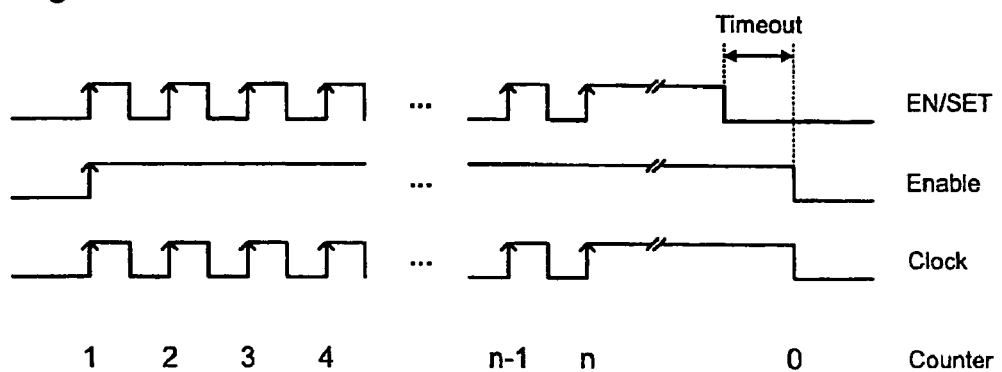
FIG. 3 is a timing diagram illustrating the use of the single wire serial interface of the IC of FIG. 2.

The relationship between the EN/SET signal and the Clock and Enable signals is shown in more detail in the timing diagram of FIG. 3. As shown in that figure, a rising transition of the EN/SET signal causes sensing circuit 210 to assert the Enable signal. Sensing circuit 210 holds the Enable signal high until the EN/SET signal transitions to a logical low state and remains in the low state until the predetermined timeout period has elapsed. The Enable signal acts to gate the Clock signal. As long as the Enable signal remains high, sensing circuit 210 forwards the EN/SET signal as the Clock signal. Counter 212 receives both the Clock and Enable signal. The first rising transition of the EN/SET signal raises the Enable signal and causes the EN/SET signal to be forwarded as the Clock signal. Counter 212 responds by increasing its value to one. Subsequent rising transitions causes Counter 212 to increment its value to two, three and so on. Counter 212 resets to zero when sensing circuit 210 transitions the Enable signal to a low value.

The n output bits of counter 212 control a ROM 214. ROM 214 has a total of $2^n$ words, each having m bits. Each m-bit word corresponds to one control state for IC 200. The n-bit output of counter 212 selects a particular m-bit word within ROM 214. The selected control state and Enable signal are passed to core portion 208. Core portion 208 is configured to adjust its operation to match the selected control state.

Sensing Circuit

Figure 4:
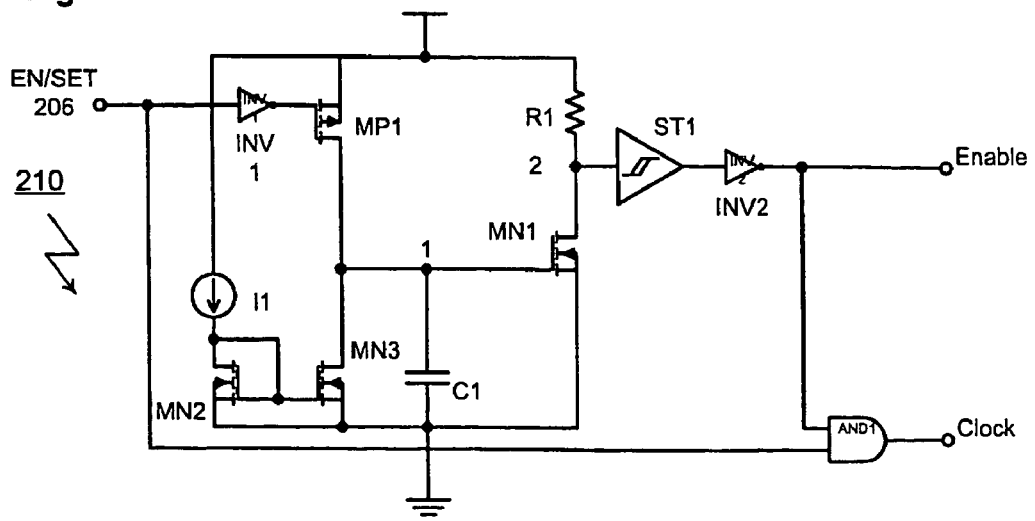
FIG. 4 is a diagram showing a sensing circuit appropriate for use in the IC of FIG. 2.

FIG. 4 shows a representative implementation for sensing circuit 210. As shown in that figure, sensing circuit 210 produces the Enable and Clock signals by timing the logic low period of the EN/SET signal. As long as the timeout period is not exceeded, the Enable signal will remain high, and the EN/SET signal will feed through logic gate AND1 to become the Clock signal. In the described implementation, the timer consists of capacitor C1 and current source I1. Transistors MN2 and MN3 mirror current source I1. This linearly discharges capacitor C1 when the EN/SET signal is a logical low, and transistor MP1 is off. If the EN/SET signal remains in a logic low state long enough, capacitor C1 will discharge to a voltage that is less than the threshold of transistor MN1 and turn MN1 off. When MN1 is off, R1 pulls node "2" to the threshold of Schmit trigger ST1 and the Enable signal goes to a logic low state. As long as the EN/SET signal remains low for a period less than the timeout period, the Enable signal will remain in a logic high state. The timeout period is dominated by the power supply voltage, the threshold of transistor MN1 ($V_{tmin}$), the value of capacitor C1, and the magnitude of current source I1, given by:

$$\text{Timeout} = C^*(V_{cc} - V_{tMN1})/I1$$

Typical values of C1=10 pF, Vcc=5 v, $V_{tMN1}$=1 v and I1 =0.1 µA yield a timeout period of 400 µs. Sensing circuit 210 can respond to a 400 ns signal of the EN/SET signal. As a result, it is able to differentiate between the EN/SET signal as Clock and EN/SET signal as Enable. A typical application can be designed around a range of EN/SET frequencies between 1 Mhz to 10 kHz, or slower if desired.

Latched Single Wire Serial Interface

Devices that implement the just described single wire serial interface select a new control state each time a rising edge of a clock pulse is received. One result is that compatible devices progressively select each control state in sequence until the desired control state is reached. So, selecting the eighth control state means that compatible devices will progressively select control states one through seven before finally selecting the eighth (desired) control state. For some devices this behavior is acceptable or even desirable. This can be true, for example where the device is a current source where progressively increasing output can be benign or even useful. In other cases, selection of intermediate control states may have unwanted side effects. This could be true for the case of the multiple load switch that is described below.

Figure 5:
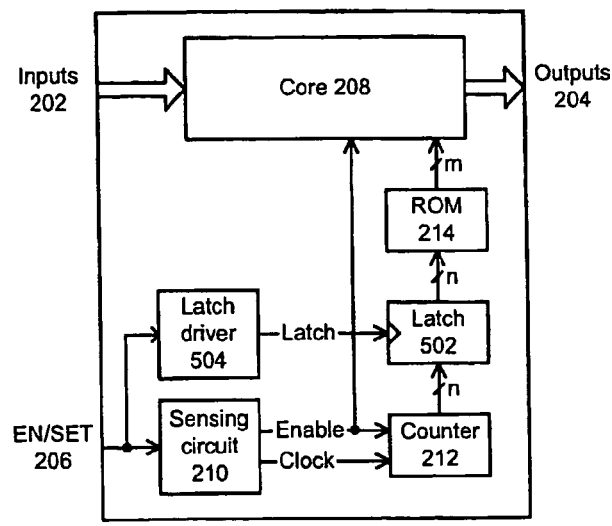
FIG. 5 is a block diagram showing an IC using a latched implementation of single wire serial interface according to one aspect of the present invention.

FIG. 5 shows a block diagram of an IC (generally designated 500) that uses an implementation of the single wire serial interface that eliminates intermediate control states. IC 500 includes the majority of components previously described for FIG. 2 and IC 200. In this case, the output of counter 212 is passed through a latch 502 before reaching ROM 214. Latch 502 is controlled by a Latch signal generated by a latch driver circuit 504.

Figure 6:
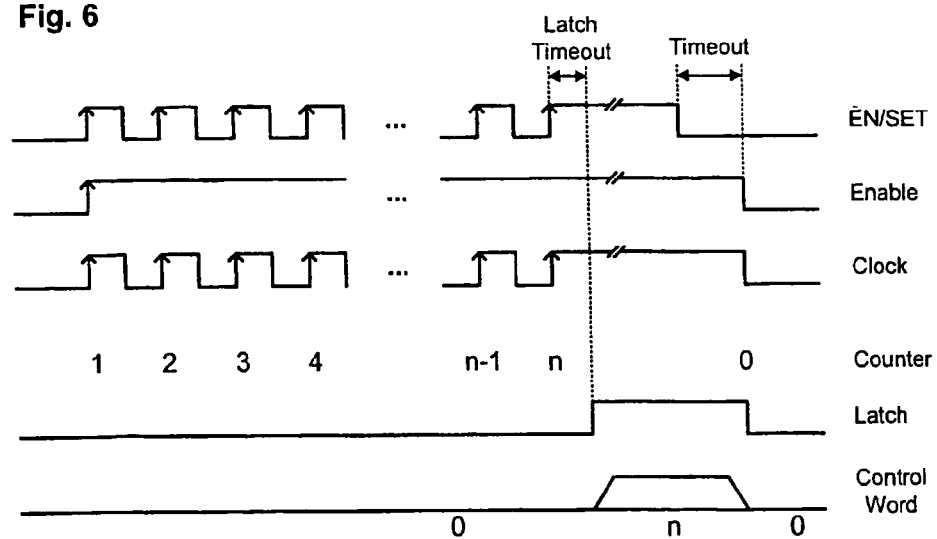
FIG. 6 is a timing diagram illustrating the use of the single wire serial interface of the IC of FIG. 5.

The relationship between the EN/SET, Clock, Enable and Latch signals is shown in FIG. 6. As shown, the Latch signal remains low until the EN/SET signal has been maintained in a high state for a duration that exceeds a predetermined latch timeout period. Holding the EN/SET signal high for longer than the latch timeout period causes latch driver 504 to assert the Latch signal. This, in turn causes latch 502 to forward the accumulated value of counter 212 to ROM 214. The result is that counter 212 is prevented from forwarding intermediate control states until the EN/SET signal has been asserted high after the train of clock pulses has been completed.

Latch Driver Circuit

Figure 7:
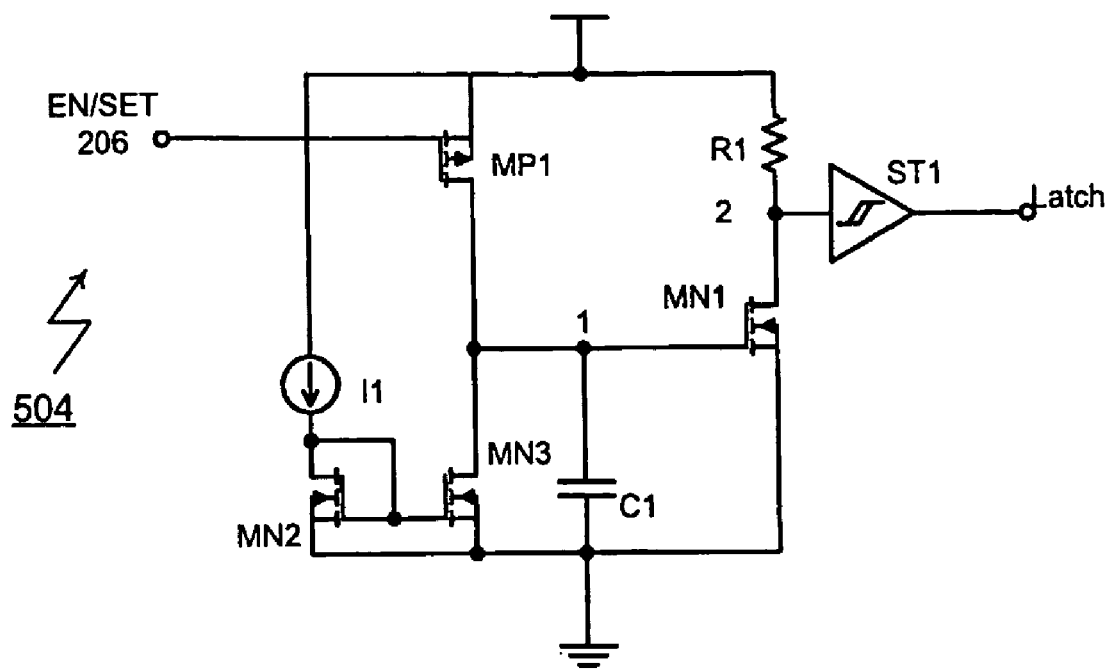
FIG. 7 is a diagram showing a latch driver circuit appropriate for use in the IC of FIG. 2.

FIG. 7 shows a representative implementation for latch driver 504. As shown in that figure, latch driver 504 produces the Latch signal by timing the logic high period of the EN/SET signal. As long as the EN/SET signal is high for less than the latch timeout period, the Latch signal remains low. In the described implementation, the timer consists of capacitor C1 and current source I1. Transistors MN2 and MN3 mirror current source I1. This linearly discharges capacitor C1 when the EN/SET signal is a logical high, and transistor MP1 is off If the EN/SET signal remains in a logic high state long enough, capacitor C1 will discharge to a voltage that is less than the threshold of transistor MN1 and turn MN1 off. When MN1 is off, R1 pulls node "2" to the threshold of Schmit trigger ST1 and the Latch signal goes to a logic high state. As long as the EN/SET signal remains high for a period less than the latch timeout period, the Latch signal will remain in a logic low state. The latch timeout period is dominated by the power supply voltage, the threshold of transistor MN1 ($V_{tMN1}$), the value of capacitor C1, and the magnitude of current source I1, given by:

$$\text{Latch Timeout} = C^*(Vcc - V_{tMN1})/I1$$

Typical values of C1=10 pF, Vcc=5 v, $V_{tMN1}$=1 v and I1 =0.1 µA yield a latch timeout period of 400 µs. Latch driver 504 can respond to a 400 ns signal of the EN/SET signal. As a result, it is able to differentiate between the EN/SET signal as Clock and EN/SET signal as Latch. A typical application can be designed around a range of EN/SET frequencies between 1 Mhz to 10 kHz; or slower if desired.

Decoder

ROM 214 provides a mapping between the EN/SET signal and associated control states for IC 200. In some cases, there may be relatively few control states. In other cases, the mapping may be defined functionally. In these cases, it is possible to replace ROM 214 with a decoder. This allows the outputs of counter 212 to be directly decoded in logic without the complexity of a ROM.

LED Driver

The white LED has become the backlight source of choice for small displays, used in products such as cell phones that typically use a lithium ion battery for power. The white LED is an excellent light source. However, it requires from 3.6 to 4.1 volts of forward bias voltage to conduct current and emit light. Since the lithium ion battery runs between 4.1 and 2.9 volts, a regulated boosted voltage must be generated to power the LED. Four LED's are typically used in a display; either in a serial or a parallel arrangement.

The lowest cost solution is to drive the four LED's in parallel with a charge pump. The higher cost solution is to drive the four LED's in series with a DC/DC boost converter capable of boosting the lithium ion battery up to four times the forward voltage of the LEDs (e.g. 4×4.1=16.4 volts). The DC/DC boost converter is higher cost due to the cost and size of the required inductor, but since the LED is really a current mode device, the performance is better because all of the LED's in series will be biased with the same current and share the same luminosity.

The charge pump solution is attractive because small low cost capacitors can be used to develop a voltage of up to 1.5 or 2 times the battery voltage. The disadvantage to the charge pump solution is that the resulting voltage must be sensed as a current for brightness control of the LED. A single voltage can drive multiple LED's, however only one LED is used as the current reference. This is achieved by adding a current setting and sensing resistor in series with it. The additional LED's have a matching resistor in series, but unless their forward voltages match that of the reference LED, they will have substantially different currents and, as such, brightness levels. A better solution would have parallel current outputs for driving the LED with a current. In this manner, all LED's would have the same bias current and luminosity. The parallel outputs however, require more pins and a larger package that is a significant disadvantage.

Another issue is brightness control. Brightness control can be performed by setting a reference current and leaving it constant, or by applying some control means to the DC/DC converter to obtain a different output voltage or current. One way to control the brightness of an LED is to simply turn it on and off at a higher frequency than the human eye can detect, and pulse width modulate (PWM) the on-time. An easier system solution would be an interface whereby a current control is input to the DC/DC converter to control the output current. This can be accomplished either by a control voltage or a digital interface. A simple solution is a digital interface, but to have enough resolution, or a large enough range, many bits of control are required. This leads again to higher undesirable pin count.

Since the human eye senses brightness logarithmically, a useful digital control would result in a logarithmic brightness scale. A logarithmic scale that adequately covers two decades of luminosity requires at least 5-bits or 32 levels.

An aspect of the present invention provides an LED driver that effectively meets all of these requirements. The LED driver is preferably configured as a 12-pin device with four LED current source outputs. The LED driver also includes an EN/SET input that supports the single wire serial protocol described above. The EN/SET input functions as the on/off control as well as the brightness control. Internally, the LED driver includes a five-bit counter and a thirty-two word ROM. The control states included in the ROM are configured to provide logarithmically increasing levels of luminosity. The counter and ROM are scaleable to any number of levels beyond or below 32.

Multiple Load Switch

Another aspect of the present invention is a load switch IC incorporating the interface described in the preceding paragraphs. For an eight-pin package, the load switch includes one EN/SET input, five outputs, a power input and a ground input. For the case of the load switch, the bits in the counter may be used to directly control the state of the individual outputs (i.e., each bit determines the state of a corresponding output). This allows the ROM to be omitted from the load switch IC, simplifying its design. The bits in the counter yield a total of 25 or thirty-two different output configurations (i.e., all possible configurations). If the load switches are very slow to respond, the single wire serial interface can be operated at a much higher frequency than the switches can respond and the outputs will be well behaved. In the case where the switches are fast, an addition must be made whereby the value clocked into the single wire serial interface is not latched until the clocking has stopped.

Current Limited Load Switch with Configurable Current Limit

Another aspect of the present invention is a current limited load switch IC incorporating the interface described in the preceding paragraphs. The current limited load switch includes one or more outputs and one EN/SET input. Each word in the ROM corresponds to a different current limit for the one or more outputs. The current limited load switch is disabled a predetermined period after the EN/SET transitions to the low state.

Although particular embodiments of the present invention have been shown and described, it will be apparent to those skilled in the art that changes and modifications may be made without departing from the present invention in its broader aspects, and therefore, the appended claims are to encompass within their scope all such changes and modifications that fall within the true scope of the present invention.

What is claimed is:

1. A power integrated circuit device having at least one input and at least one output, comprising:
    a core circuit producing at least one output from the power integrated circuit; and an interface for controlling the core circuit, the interface including,
    a first circuit for receiving a signal via a single input of the integrated circuit, the first circuit for accumulating a count of clock pulses encoded in the received signal,
    a second circuit for mapping the count of encoded clock pulses into a corresponding one of a plurality of control states for the core circuit;
    a third circuit for resetting the count of encoded clock pulses to zero in response to the received signal being low for a period that exceeds a predetermined timeout value, the predetermined timeout value being longer than a width of one of the encoded clock pulses;
    a fourth circuit including a latch operative to receive the accumulated count from the first circuit; and
    a fifth circuit responsive to the received signal, the fifth circuit producing a latch signal that is asserted in response to the received signal being maintained high for a period that exceeds a predetermined latch timeout value; and wherein the latch is responsive to the latch signal, and operative to forward the accumulated count to the second circuit in response to the latch signal being asserted.

2. A power integrated circuit as recited in claim 1, wherein the second circuit maps an n-bit count value output by the first circuit to a corresponding m-bit word, each m-bit word corresponding to one of the control states for the device.

3. A power integrated circuit as recited in claim 1, wherein the second circuit provides for mapping the accumulated count into a corresponding one of a plurality of more than two control states for the device.

4. A power integrated circuit as recited in claim 1, wherein the second circuit further comprises a read only memory (ROM), the ROM including one word for each control state of the device, each word addressable by a corresponding one of the count values.

5. A power integrated circuit as recited in claim 1, wherein the second circuit further comprises an array of logic elements configured to directly map each of the count values to a corresponding control state for the device.

6. A power integrated circuit as recited in claim 1, wherein the interface maintains the count of clock pulses for at least as long as the received signal remains high.

7. A power integrated circuit as recited in claim 1, wherein the interface maintains the control state corresponding to the accumulated count for as long as the received signal remains high.

8. A power integrated circuit as recited in claim 1, wherein:
    the third circuit generates an enable signal, the enable signal being asserted in response to a first clock pulse of the received signal, and being de-asserted in response to the received signal being low for a period that exceeds the predetermined timeout value;
    the first circuit accumulates the count while the enable signal is asserted, and maintains the accumulated count for as long as the enable signal remains asserted after the count has been accumulated; and
    the first circuit resets the count to zero when the enable signal is de-asserted.

9. A power integrated circuit as recited in claim 1, wherein the integrated circuit includes a multi-pin package, and wherein the single input comprises a single pin.

10. A power integrated circuit as recited in claim 1, wherein the power integrated circuit device is an LED current source integrated circuit, wherein the at least one output provides an LED current source output, and wherein each of the control states corresponds to one of a plurality of LED current source output levels.

11. A power integrated circuit as recited in claim 1, wherein the power integrated circuit device comprises a plurality of load switch outputs, and wherein each of the control states corresponds to a different combination of off and on states for the load switch outputs.

12. A power integrated circuit as recited in claim 1, wherein the power integrated circuit device comprises a series of current limited load switch outputs, and wherein each of the control states corresponds to a current limit for the limited load switch outputs.

13. A power integrated circuit device having at least one input and at least one output, comprising:
    a core circuit producing at least one output from the power integrated circuit; and an interface for controlling the core circuit, the interface including,
    a first circuit for receiving a signal via a single input of the integrated circuit, the first circuit for accumulating a count of clock pulses encoded in the received signal;
    a second circuit for mapping the count of encoded clock pulses into a corresponding one of a plurality of control states for the core circuit;
    a third circuit for resetting the count of encoded clock pulses to zero in response to the received signal being low for a period that exceeds a predetermined timeout value, the predetermined timeout value being longer than a width of one of the encoded clock pulses;

the first circuit outputs progressively increasing count values during the accumulating of the count of clock pulses encoded in the received signal; and the second circuit is responsive to the count values, and operative to progressively map each of the count values output during the accumulating to a corresponding one of a plurality of intermediate control states.

14. A power integrated circuit as recited in claim 13, wherein the second circuit further comprises a read only memory (ROM), the ROM including one word for each control state of the device, each word addressable by a corresponding one of the count values.

15. A power integrated circuit as recited in claim 13, wherein the second circuit further comprises an array of logic elements configured to directly map each of the count values to a corresponding control state for the device.

16. A power integrated circuit as recited in claim 13, wherein the interface maintains the count of clock pulses for at least as long as the received signal remains high.

17. A power integrated circuit as recited in claim 13, wherein the interface maintains the control state corresponding to the accumulated count for as long as the received signal remains high.

18. A power integrated circuit as recited in claim 13, wherein:

the third circuit generates an enable signal, the enable signal being asserted in response to a first clock pulse of the received signal, and being de-asserted in response to the received signal being low for a period that exceeds the predetermined timeout value;

the first circuit accumulates the count while the enable signal is asserted, and maintains the accumulated count for as long as the enable signal remains asserted after the count has been accumulated; and the first circuit resets the count to zero when the enable signal is de-asserted.

19. An interface for controlling a device as recited in claim 13, wherein the second circuit provides for mapping each of the count values into a corresponding one of a plurality of more than two intermediate control states for the device.

20. A power integrated circuit as recited in claim 13, wherein the second circuit maps an n-bit count value output by the first circuit to a corresponding m-bit word, each m-bit word corresponding to one of the plurality of intermediate control states for the device.

21. A power integrated circuit as recited in claim 13, wherein the integrated circuit includes a multi-pin package, and wherein the single input comprises a single pin.

22. A power integrated circuit as recited in claim 13, wherein the power integrated circuit device is an LED current source integrated circuit, wherein the at least one output provides an LED current source output, and wherein each of the control states corresponds to one of a plurality of LED current source output levels.

23. A power integrated circuit as recited in claim 13, wherein the power integrated circuit device comprises a plurality of load switch outputs, and wherein each of the control states corresponds to a different combination of off and on states for the load switch outputs.

24. A power integrated circuit as recited in claim 13, wherein the power integrated circuit device comprises a series of current limited load switch outputs, and wherein each of the control states corresponds to a current limit for the limited load switch outputs.

25. A power integrated circuit having at least one input and at least one output, comprising:

a core circuit operative to provide at least one output from the power integrated circuit; and an interface for controlling the core circuit, the interface including;

a first circuit for receiving a signal via a single input of the integrated circuit, the first circuit for accumulating a count of clock pulses encoded in a received signal, the received signal having a first level and a second level, the encoded clock pulses including a transition from the first level to the second level and a transition from the second level to the first level;

a second circuit for mapping the count of encoded clock pulses into a corresponding one of a plurality of control states for the core circuit;

a third circuit for resetting the count of encoded clock pulses to zero in response to the received signal being at the first level for a period that exceeds a predetermined timeout value after a transition from the second level to the first level, the predetermined timeout value being longer than a width of one of the encoded clock pulses;

a fourth circuit including a latch operative to receive the accumulated count from the first circuit; and a fifth circuit responsive to the received signal, the fifth circuit producing a latch signal that is asserted in response to the received signal being maintained at the second level for a period that exceeds a predetermined latch timeout value; and wherein the latch is responsive to the latch signal, and operative to forward the accumulated count to the second circuit in response to the latch signal being asserted.

26. A power integrated circuit as recited in claim 25, wherein the second circuit further comprises a read only memory (ROM), the ROM including one word for each control state of the device, each word addressable by a corresponding one of the count values.

27. A power integrated circuit as recited in claim 25, wherein the second circuit further comprises an array of logic elements configured to directly map each of the count values to a corresponding control state for the device.

28. A power integrated circuit as recited in claim 25, wherein the interface maintains the count of clock pulses for at least as long as the received signal remains at the second level.

29. A power integrated circuit as recited in claim 25, wherein the interface maintains the control state corresponding to the accumulated count for at least as long as the received signal remains at the second level following the accumulating of the count.

30. A power integrated circuit as recited in claim 25, wherein:

the third circuit generates an enable signal, the enable signal being asserted in response to a first clock pulse of the received signal, and being de-asserted in response to the received signal being at the first level for a period that exceeds the predetermined timeout value; the first circuit accumulates the count while the enable signal is asserted, and maintains the accumulated count for at least as long as the enable signal remains asserted;

and the first circuit resets the count to zero when the enable signal is de-asserted.

31. A power integrated circuit as recited in claim 25, wherein the second circuit maps an n-bit count value output by the first circuit to a corresponding m-bit word, each m-bit word corresponding to one of the control states.

32. A power integrated circuit as recited in claim 25, wherein the second circuit provides for mapping the accumulated count into a corresponding one of a plurality of more than two control states for the device.

33. A power integrated circuit as recited in claim 25, wherein the integrated circuit includes a multi-pin package, and wherein the single input comprises a single pin.

34. A power integrated circuit as recited in claim 25, wherein the power integrated circuit device is an LED current source integrated circuit, wherein the at least one output provides an LED current source output, and wherein each of the control states corresponds to one of a plurality of LED current source output levels.

35. A power integrated circuit as recited in claim 25, wherein the power integrated circuit device comprises a plurality of load switch outputs, and wherein each of the control states corresponds to a different combination of off and on states for the load switch outputs.

36. A power integrated circuit as recited in claim 25, wherein the power integrated circuit device comprises a series of current limited load switch outputs, and wherein each of the control states corresponds to a current limit for at least one of the limited load switch outputs.

37. A power integrated circuit having at least one input and at least one output, comprising:
   a core circuit operative to provide at least one output from the power integrated circuit; and an interface for controlling the core circuit, the interface including;
   a first circuit for receiving a signal via a single input of the integrated circuit, the first circuit for accumulating a count of clock pulses encoded in a received signal, the received signal having a first level and a second level, the encoded clock pulses including a transition from the first level to the second level and a transition from the second level to the first level;
   a second circuit for mapping the count of encoded clock pulses into a corresponding one of a plurality of control states for the core circuit;
   a third circuit for resetting the count of encoded clock pulses to zero in response to the received signal being at the first level for a period that exceeds a predetermined timeout value after a transition from the second level to the first level, the predetermined timeout value being longer than a width of one of the encoded clock pulses;
   the first circuit outputs progressively increasing count values during the accumulating of the count of clock pulses encoded in the received signal; and
   the second circuit is responsive to the count values, and operative to progressively map each of the count values output during the accumulating to a corresponding one of a plurality of intermediate control states.

38. A power integrated circuit as recited in claim 37, wherein the second circuit maps each of the count values into a corresponding one of a plurality of more than two intermediate control states for the device.

39. A power integrated circuit as recited in claim 37, wherein the first circuit outputs n-bit count values, and the second circuit maps each of the n-bit count values to a corresponding m-bit word, each m-bit word corresponding to one of the intermediate control states.

40. A power integrated circuit as recited in claim 37, wherein the second circuit further comprises a read only memory (ROM), the ROM including one word for each control state of the device, each word addressable by a corresponding one of the count values.

41. A power integrated circuit as recited in claim 37, wherein the second circuit further comprises an array of logic elements configured to directly map each of the count values to a corresponding control state for the device.

42. A power integrated circuit as recited in claim 37, wherein the interface maintains the count of clock pulses for at least as long as the received signal remains at the second level.

43. A power integrated circuit as recited in claim 37, wherein the interface maintains the control state corresponding to the accumulated count for at least as long as the received signal remains at the second level following the accumulating of the count.

44. A power integrated circuit as recited in claim 37, wherein the integrated circuit includes a multi-pin package, and wherein the single input comprises a single pin.

45. A power integrated circuit as recited in claim 37, wherein the power integrated circuit device is an LED current source integrated circuit, wherein the at least one output provides an LED current source output, and wherein each of the control states corresponds to one of a plurality of LED current source output levels.

46. A power integrated circuit as recited in claim 37, wherein the power integrated circuit device comprises a plurality of load switch outputs, and wherein each of the control states corresponds to a different combination of off and on states for the load switch outputs.

47. A power integrated circuit as recited in claim 37, wherein the power integrated circuit device comprises a series of current limited load switch outputs, and wherein each of the control states corresponds to a current limit for at least one of the limited load switch outputs.

* * * * *